2,894,951

HETEROCYCLIC POLYAMINE SALTS OF PHOSPHORODITHIOIC ACID ESTERS AND COMPOSITIONS CONTAINING THE SAME

Allen F. Millikan, Crystal Lake, and Gifford W. Crosby, River Forest, Ill., assignors to The Pure Oil Company, Chicago, Ill., a corporation of Ohio No Drawing. Application April 25, 1957
Serial No. 655,011

10 Claims. (Cl. 260—248.5)

This invention relates to salts of partial esters of phosphorodithioic acid and more particularly to a composition consisting of a major proportion of one of said salts and a minor proportion of a material which stabilizes the salt from decomposition and evolution of hydrogen sulfide.

The metal and ammonium salts of partial esters of phosphorodithioic acid are known compounds and have a wide variety of uses. These salts are known to be useful in pesticide compositions, corrosion inhibitors, plasticizers, ore flotation agents and lubricant compositions. The ammonium salts of dialkyl or diaryl esters of phosphorodithioic acid are easily made and are useful in the compositions above indicated. However, these salts have a tendency to decompose readily on storage with the continuous evolution of hydrogen sulfide. The hydrogen sulfide which is thus generated is not only objectionable for aesthetic reasons but is also a dangerous poison of extreme toxicity.

One of the objects of this invention is to provide an improved composition consisting essentially of a salt of a partial ester of phosphorodithioic acid having incorporated therein a stabilizing material preventing decomposition of the mixture.

A feature of this invention is the provision of a salt of a dialkyl or diaryl ester of phosphorodithioic acid, having incorporated therein a small amount of a cyclic polyamine salt of the partially esterified phosphorodithioic acid which is operable to mitigate decomposition of the mixture and evolution of hydrogen sulfide.

Other objects and features of this invention will become apparent from time to time throughout the specification and claims as hereinafter related.

In the performance of this invention a dialkyl or diaryl ester of phosphorodithioic acid is prepared by known methods, such as the reaction of phosphorus pentasulfide with an alcohol. The product obtained is converted into an ammonium salt by reaction with ammonia gas. The ammonium salt which is thus obtained is stabilized against decomposition by the addition of a small amount (at least 0.1 mole percent) of a salt of a heterocyclic polyamine and a dialkyl or diaryl ester of phosphorodithioic acid which is operable to prevent the decomposition of the ammonium salt to evolve hydrogen sulfide. The cyclic polyamine salt may be added separately to the mixture or may be formed in situ by suitable reaction. The heterocyclic polyamine salt is preferably a di, tri, or tetramine, such as hexamethylenetetramine or a trialkyl cyclotrimethylenetriamine, which may be prepared by reacting ammonia or an alkyl amine with formaldehyde. Other cyclic polyamines which may be used in preparing stabilizing salts include piperazine, alkyl-substituted piperazines and alkyl isomelamines.

The partial esters of phosphorodithioic acid with which the heterocyclic polyamines are combined to form stabilizing salts include alkyl, aryl, aralkyl and alkaryl esters in which the hydrocarbon groups contain four to twenty carbon atoms and preferably those which contain two hydrocarbon radicals. These hydrocarbon groups may contain other substituents, such as oxygen, sulphur, and nitrogen in the form of hydroxyl, thiol, or amino radicals. The salts may be of the same acid from which the major constituents of the composition is derived or may be of a different acid. Specific examples of salts which are useful in stabilizing phosphorodithioates are:

(1) Piperazine salt of O,O-di-2-ethylhexyl phosphorodithioic acid.
(2) N,N'-dibutylpiperazine salt of O,O-di-(octylphenyl) phosphorodithioic acid.
(3) Ethylisomelamine salt of O,O-didecyl phosphorodithioic acid.
(4) Hexamethylenetetramine salt of O,O-didodecyl phosphorodithioic acid.
(5) Piperazine salt of S,S-didodecyl phosphorodithioic acid.
(6) Hexamethylenetetramine salt of O,O-di-2-ethylbutyl phosphorodithioic acid.
(7) N,N'-dioctylpiperazine salt of O,O-diphenyl phosphorodithioic acid.
(8) Hexamethylenetetramine salt of O,O-di(phenylpropyl) phosphorodithioic acid.
(9) N,N',N''-trimethyltrimethylenetriamine salt of O,O-di-2-ethylhexyl phosphorodithioic acid.
(10) Hexamethylenetetramine salt of O,O-di(2-ethylhexyl) phosphorodithioic acid.

The following examples illustrate the manner in which the compositions of this invention can be prepared.

Example I

To 195 grams of 2-ethylhexanol, 195 grams of toluene and 195 grams of solvent-refined neutral oil, having a SUS viscosity of 85 at 100° F., there was added 83.5 grams of phosphorus pentasulfide so that the mixture contained 1.5 mols of the alcohol to 0.38 mol of phosphorus pentasulfide. The mixture was stirred for four hours on a steam bath and the resulting acid solution then filtered under a vacuum. Then 0.125 mol of the acid thus produced was charged to a reaction vessel and ammonia was bubbled through with vigorous stirring over a period of one hour. After this period of reaction, excess solvent and any unreacted ammonia were removed by vacuum-nitrogen stripping, and the product was filtered under vacuum. The product was analyzed and found to be ammonium di(2-ethylhexyl) phosphorodithioate. The product as obtained by this reaction was found to be somewhat unstable and gave a strong odor of hydrogen sulfide. This product was examined periodically over a period of three months and always had a strong odor of hydrogen sulfide.

Example II

In another experiment ammonium di(2-ethylhexyl) phosphorodithioate was prepared in a stabilized form. Di-(2-ethylhexyl) phosphorodithioic acid was prepared in the manner described in Example I. A reaction vessel was then charged with 0.125 mol of the acid and 0.125 mol (3.6 g.) of formaldehyde (as paraformaldehyde) for reaction. Anhydrous ammonia was bubbled through the reaction mixture with vigorous stirring for a period of one hour. Excess ammonia and solvents were removed by stripping with nitrogen under vacuum, and the stripped product was filtered under reduced pressure. Analysis of the product (on the basis of 58.8 wt. percent of salt in mineral oil) showed a nitrogen content of 3.5 wt. percent which corresponds to a mixture of the ammonium and hexamethylenetetramine salts of the diester of phosphorodithioic acid. In this composition, the hexamethylenetetramine salt is a minor proportion (about 16.7 mole percent) of the total composition. The product thus obtained did not have any odor of hydrogen sulfide and was examined periodically over a period of three months without detection of any odor of hydrogen sulfide.

*Example III*

In still another experiment ammonium di-(2-ethylhexyl) phosphorodithioate was prepared in a stabilized form. A reaction flask was charged with 0.031 mol of di-(2-ethylhexyl) phosphorodithioic acid, prepared as described in Example I and .0016 mol (0.23 g.) of hexamethylenetetramine. Ammonia was bubbled through the reaction mixture with vigorous stirring over a period of one hour. Excess solvent and ammonia were removed by nitrogen stripping at ambient temperature over a period of three hours. At the end of this time a product was obtained which consisted essentially of ammonium di(2-ethylhexyl) phosphorodithioate, together with a minor proportion (about 5.0 mole percent) of hexamethylenetetramine salt of di(2-ethylhexyl) phosphorodithioic acid. The product thus obtained was free of hydrogen sulfide odor. This product was stored at 58° C. for 16 hours. At the end of this storage period the product was still free of hydrogen sulfide odor.

*Example IV*

To 195 grams of 2-ethylhexyl alcohol, 195 grams of toluene and 195 grams of solvent-refined neutral oil having an SUS viscosity of 85 at 100° F. there was added 83.5 grams of phosphorus pentasulfide so that the mixture contained 1.5 mols of the alcohol to 0.38 mol of phosphorus pentasulfide. The mixture was stirred for four hours on the steam bath and the resulting acid solution then filtered and treated with 133 grams (0.94 mol) of hexamethylenetetramine at room temperature. After the mixture was allowed to react for 16 hours it was diluted with hexane and excess hexamethylenetetramine separated by filtration. A crystallized product separated from the filtrate on chilling to a temperature of −30° F., attained a yield of 90%. Upon recrystallizing the product from hexane, a white solid was obtained having a melting point of 69–70° C. and analyzing nitrogen 10.5%, phosphorus 6.1%, sulful 12.8%. These values are close to the calculated values of 11.3% nitrogen, 6.3% phosphorus and 13.0% sulfur for hexamethylenetetrammonium di - 2 - ethylhexylphosphorodithioate. The product was hydrolyzed with dilute hydrochloric acid at room temperature. The aqueous solution thus obtained was neutralized and tested with sodium hypobromite and iodine respectively. These qualitative tests produced yellow and orange-red precipitates, respectively, which are confirmatory evidence for the presence of hexamethylenetetramine. This regeneration of hexamethylenetetramine from the product, together with the elemental analyses confirms the identity of the product as hexamethylenetetrammonium di-2-ethylhexyldithiophosphate. This product is useful, as indicated in Examples II and III, for stabilizing ammonium salts of diesters of phosophorodithioates against evolution of hydrogen sulfide. This compound was found, in additional tests, to be operative as a stabilizer in concentrations from 0.1 to 100%.

The stabilized products produced in Examples II and III and the compound produced in Example IV are useful as lubricating oil additives. When these products are added to lubricating oil in the amount of .05 to .5% by weight phosphorus equivalent, there is produced a lubricating oil composition which has improved antiwear properties. These products may also be added to lubricating oils which contain other well-known additives, such as detergents, pour point depressants and viscosity index improvers. Lubricating oil compositions, including the products produced in Examples II and III, are described and claimed in our co-pending patent application, Serial No. 631,516, filed December 31, 1956, of which this application is a continuation in part. The compositions produced in Examples II and III can also be used in ore flotation processes, as described in Patent 2,206,284, and in pesticides, corrosion inhibitors and plasticizers where the use of ammonium dialkylphosphorodiothioates are suggested in the prior art.

We claim as our invention:

1. A composition consisting essentially of a mixture of (1) an ammonium salt of a diester of phosphorodithioic acid of the formula $(RO)_2P(S)SH$, where R is a $C_4$–$C_{20}$ radical selected from the group consisting of alkyl, phenyl, alkylphenyl, and phenylalkyl radicals, and (2) a heterocyclic polyamine salt of a diester of the formula $(RO)_2P(S)SH$, where R is as hereinbefore defined, said heterocyclic polyamine being selected from the group consisting of hexamethylenetetramine, tri-lower alkyl cyclotrimethylenetriamines, piperazine, lower alkyl-substituted piperazines, and lower alkyl isomelamines, including sufficient amount of compound (2) to prevent decomposition of the mixture and evolution of hydrogen sulfide.

2. A composition as defined in claim 1 in which said second-named salt is of hexamethylenetetramine.

3. A composition as defined in claim 1 in which said second-named salt is of a tri-lower alkyl cyclotrimethylenetriamine.

4. A composition as defined in claim 1 in which said second-named salt is of piperazine.

5. A composition consisting essentially of a mixture of ammonium di(2-ethylhexyl) phosphorodithioate and a minor proportion of hexamethylenetetrammonium di(2-ethylhexyl) phosphorodithioate, in an amount sufficient to prevent decomposition of the mixture and evolution of hydrogen sulfide.

6. A heterocyclic polymaine salt of a phosphorodithioic acid ester of the formula $(RO)_2P(S)SH$, where R is a $C_4$–$C_{20}$ radical selected from the group consisting of alkyl, phenyl, alkylphenyl, and phenylalkyl radicals, and where the heterocyclic polyamine is selected from the group consisting of hexamethylenetetramine, tri-lower alkyl cyclotrimethylenetriamines, piperazine, lower alkyl-substituted piperazines, and lower alkyl isomelamines.

7. A hexamethylenetetramine salt of a phosphorodithioic acid ester of the formula $(RO)_2P(S)SH$, where R is $C_4$–$C_{20}$ radical selected from the group consisting of alkyl, phenyl, alkylphenyl, and phenylalkyl radicals.

8. Hexamethylenetetrammonium di-2-ethylhexyl phosphorodithioate.

9. A method of preparing stable derivatives of phosphorodithioic acid which comprises mixing a phosphorodithioic acid ester of the formula $(RO)_2P(S)SH$, where R is a $C_4$–$C_{20}$ radical selected from the group consisting of alkyl, phenyl, alkylphenyl, and phenylalkyl radicals, with formaldehyde and passing ammonia through the mixture to produce a stable composition as defined in claim 1.

10. A method according to claim 9, in which the diester is di(2-ethylhexyl) phosphorodithioic acid.

References Cited in the file of this patent

UNITED STATES PATENTS 1,889,090  Freund _____ Nov. 29, 1932